United States Patent [19]
Cooper et al.

[11] Patent Number: 5,845,718
[45] Date of Patent: Dec. 8, 1998

[54] RESONANT OSCILLATING MASS-BASED TORQUING TOOL

[75] Inventors: Timothy R. Cooper, Owego, N.Y.; Thomas P. Low, Belmont, Calif.

[73] Assignee: Ingersoll-Rand Company, Woodcliff Lake, N.J.

[21] Appl. No.: 865,037

[22] Filed: May 29, 1997

[51] Int. Cl.⁶ .......................... B25B 14/00; B23Q 17/09
[52] U.S. Cl. .................. 173/176; 173/5; 173/93; 173/93.5; 173/20; 173/117; 173/217; 173/181; 173/183
[58] Field of Search .................. 173/20, 6, 176, 173/171, 178, 181, 182, 183, 104, 117, 217, 93, 93.5, 93.6, 210, 49; 81/469, 470

[56] References Cited

U.S. PATENT DOCUMENTS

| | | | |
|---|---|---|---|
| 4,019,589 | 4/1977 | Wallace | 173/178 |
| 4,124,026 | 11/1978 | Berner et al. | 173/213 |
| 4,524,651 | 6/1985 | Dubiel et al. | 173/171 |
| 4,887,499 | 12/1989 | Kipfelsberger | 173/177 |
| 5,094,301 | 3/1992 | Wipperman et al. | 173/5 |
| 5,285,857 | 2/1994 | Shimada | 173/181 |
| 5,457,866 | 10/1995 | Noda | 173/183 |
| 5,492,185 | 2/1996 | Schoeps et al. | 173/183 |
| 5,637,968 | 6/1997 | Kainec et al. | 81/469 |

*Primary Examiner*—Scott A. Smith
*Attorney, Agent, or Firm*—Walter C. Vliet

[57] ABSTRACT

Disclosed is a low reaction oscillating mass-based torquing tool wherein an oscillating mass is excited into near resonant oscillation by reversing pulses resulting in increased oscillation about a torsion spring to the point where the torque associated with the energy stored in the torsion spring exceeds the torque required to further tighten a fastener and the torque released from the torsion spring tightens the fastener while a biasing torque assures application of the released torque in the tightening direction only.

8 Claims, 2 Drawing Sheets

RESONANT OSCILLATING MASS-BASED TORQUING TOOL

BACKGROUND OF THE INVENTION

This invention relates generally to power tools and more particularly to inertia based handheld torquing tools. Currently, low reaction tools are typically devices that accelerate a rotary inertia mass through a relatively large travel angle. This acceleration is developed using a motor with a torque output that is relatively low compared to the output torque capability of the tool. As the inertia mass accelerates, it stores kinetic energy. After the inertia mass has traveled through a significant angle (for example, 180 degrees or more), a clutching means engages the rotary inertia mass to a workpiece. The subsequent negative acceleration of the inertia mass results in a torque output that is relatively high compared to that supplied by the accelerating motor (see FIG. 3). This high torque output is not reacted on the user, as the reaction is provided by the torque associated with the negative acceleration of the flywheel or inertia mass.

Typically, two types of clutching means are provided between the inertia mass and the workpiece. The dominant method is to utilize a mechanical clutch. Rapid engagement and disengagement of the clutch unfortunately results in the production of noise and the high stresses developed in the impact conversion zone of the clutch results in wear and deformation of parts which reduce efficiency and limit the clutch life.

A second clutching method uses a hydraulic lockup clutch. Although quieter in operation than existing mechanical clutches, the expense in manufacture and the potential for loss of hydraulic fluids limits their application.

The foregoing illustrates limitations known to exist in present devices and methods. Thus, it is apparent that it could be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a resonant oscillating mass-based torquing tool including a rotatable resonant oscillating mass; a means for effecting oscillation of the mass; a spring means connecting the oscillating mass to a rotating friction set workpiece; a means for effecting a rotation bias with the oscillating mass in one tightening rotational direction of a magnitude sufficient only in combination with a force generated by the oscillating mass in the same one tightening rotational direction to rotate the workpiece in a tightening direction; and a force generated by the oscillating mass in an opposite rotational direction minus the rotational bias being insufficient to effect rotation of the workpiece in the opposite rotational direction.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
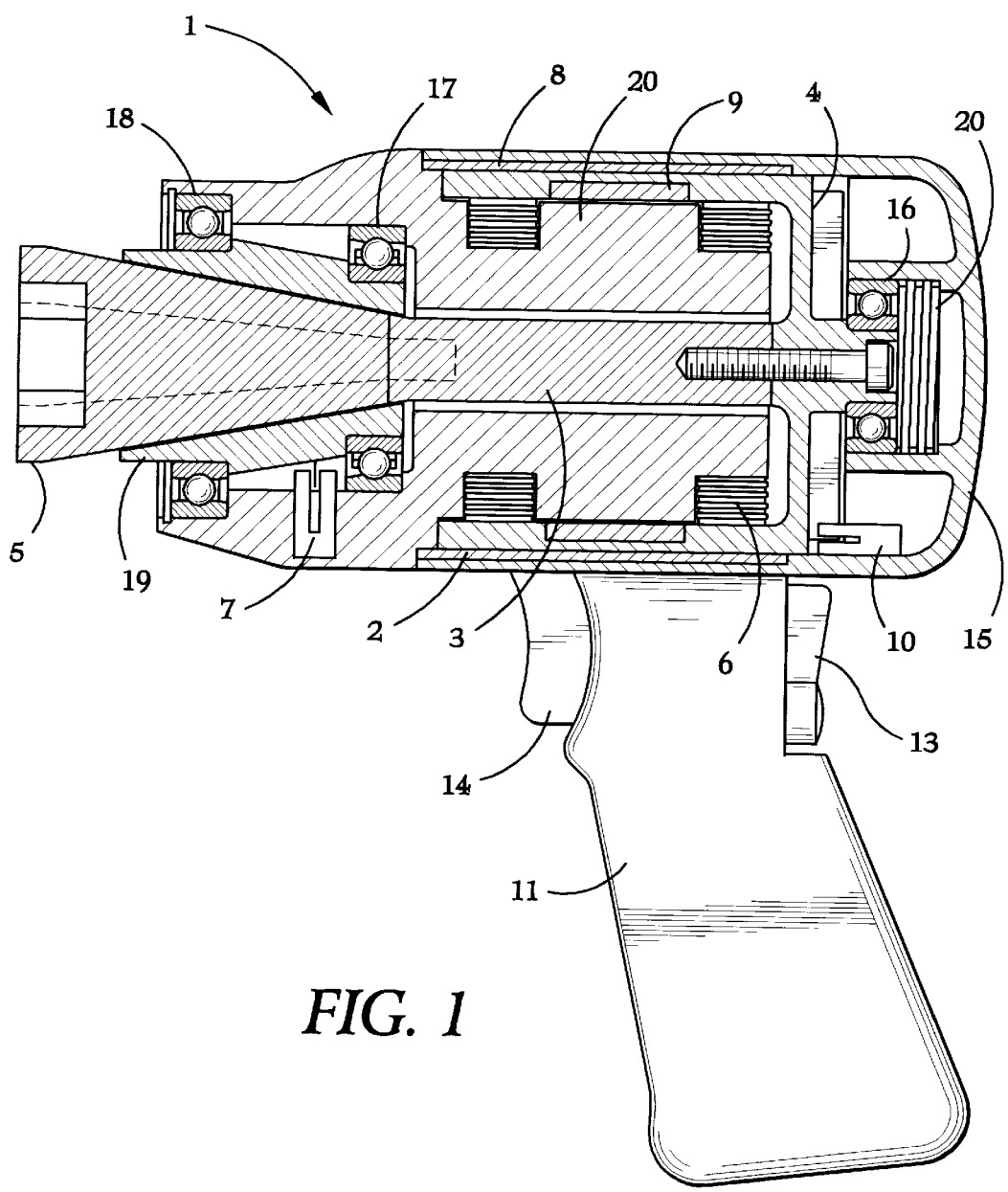
FIG. 1 is a cross sectional view of a resonant oscillating mass-based torquing tool according to the present invention.

Referring to FIG. 1, a resonant oscillating mass-based torquing tool according to the present invention is shown and generally designated by the reference numeral 1. A collet type socket or clamping means 5 engages tightly to the head of a fastener to be tightened (not shown). The collet type socket 5 is attached to a torsion spring 3 which in turn is attached to a cup shaped flywheel rotor or oscillating mass 4. The flywheel rotor 4 oscillates and rotates about an internal stator 20 in a manner which will be later described. A shield ring and magnetic return path 8 surrounds the flywheel rotor 4 and is made of a magnetic conductive material such as steel. The shield ring 8 is in turn encased in a casing 15 which forms the outside shell of the tool. A handle 11 is provided attached to the casing 15 for purpose of holding the tool. Trigger 14 activates the tool and a forward and reverse switch 13 selects the direction of rotation in either a tightening (normally clockwise) direction or an untightening direction (normally counterclockwise) as viewed by the operator.

As shown in FIG. 1, the flywheel rotor 4, torsion spring 3, and collet 5 are journalled for rotation within the housing 15 by means of bearing 16 and within an extension of the stator 20 by means of bearings 17 and 18 which surround the collet 19. A forward optical encoder 7 is provided to monitor the rotation of the collet and optical flywheel positioning encoder 10 is provided for determining the motion and position of the flywheel rotor 4.

Figure 3:
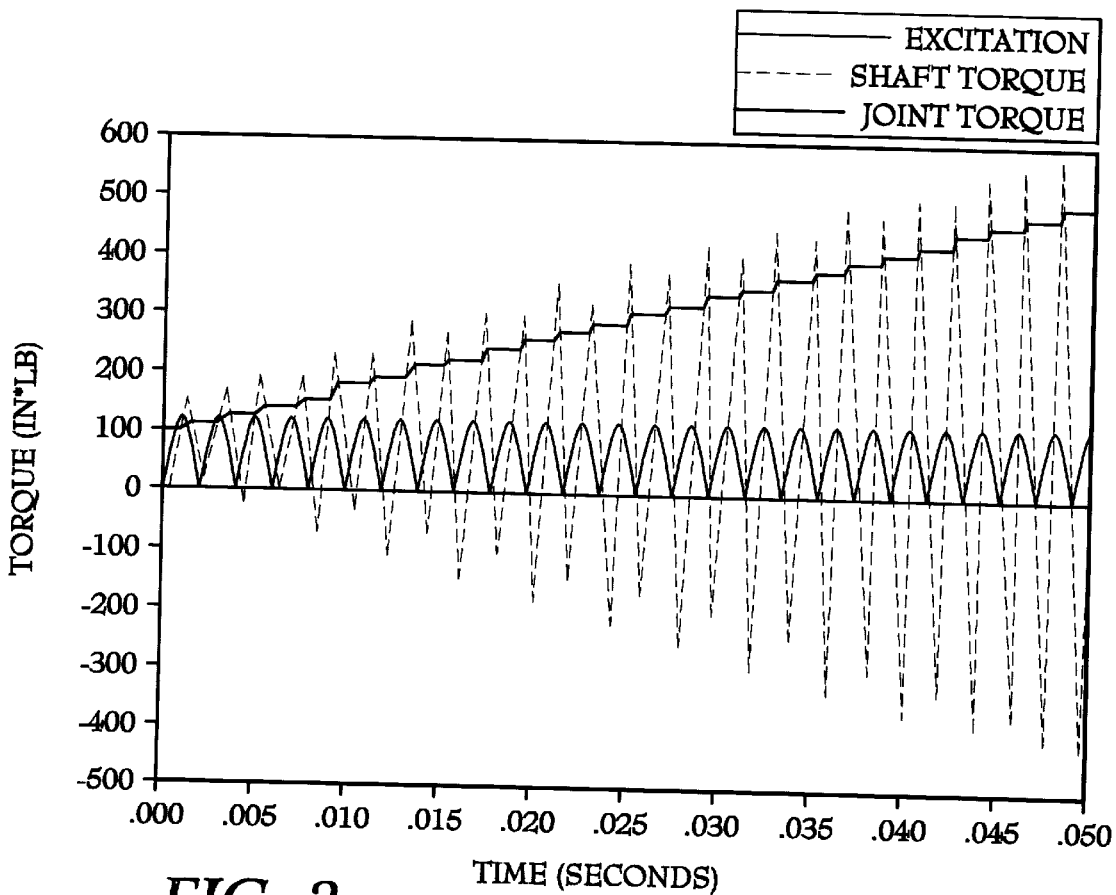
FIG. 3 is a graph showing the applied torque on a fastener over time for a resonant oscillator mass-based system tool according to the present invention.

In operation, when tightening a threaded fastener, the flywheel is driven initially as a conventional motor by means of excitation of electromagnetic coils and reaction against permanent magnets 9 to perform the rundown portion of a fastening cycle. Once the fastener reaches the output limit of the flywheel being driven as a conventional motor, the rotation of the collet type socket 5 ceases as sensed by the forward optical encoder 7. The position of the flywheel 4 is sensed by the optical positioning encoder 10. As depicted in FIG. 3, upon sensing the condition of a stalled collet, the appropriate electrical circuitry begins to oscillate the flywheel by applying reversing energy pulses to the electromagnetic coils 9 causing the flywheel to oscillate at or near the resonant frequency of the inertia mass spring system. The flywheel is continually biased in the tightening direction as the pulsed oscillation continues to build and store oscillating energy in reversing directions in the torsion spring 3. This establishes a condition wherein the oscillating energy plus the motor driven energy sum to apply a tightening torque on the fastener in one oscillating direction of the flywheel and differ on application of a reverse oscillating such that the tightening torque exceeds the loosening torque by an amount approximately equal to twice the biasing torque.

As the stored energy in each reversing pulse increases due to the at or near resonant condition of the mass spring system, the point arrives at which the applied sum of torque progresses the tightening of the fastener without a corresponding loosening on the reverse oscillation. It has been found that a driven torque of approximately 10 to 20 percent of the final output torque of the tool is required to prevent the reverse oscillation from untightening the fastener. This amount of driven torque is reacted by the operator. Using the oscillating mass principal of the present invention it is therefore possible to achieve output torques many times the operator reacted torque. Another way of stating this is that when the torque in the torsion spring exceeds the workpiece torque resisting fastener motion, the fastener would be accelerated by the difference between the torques. In this process some energy would be removed from the oscillating mass system. The motor would replace this energy and add more with repeated oscillation allowing the oscillation to continue to build up. When the desired fastener torque is reached the motor will stop exciting the flywheel.

The optical encoders 10 and 7 provide feedback for control of the tool. As stated, to prevent the fastener from loosening, the oscillating excitation torque would be imposed on top of a biasing or motor driven torque. This biasing torque would be a fraction of the torque required to tighten the joint.

In addition to the embodiment discussed above, numerous other embodiments are possible. In some cases the oscillating mass may be attached to the workpiece as in the present embodiment. In others, clutching means may be used to bias the applied torque to the workpiece after some level of kinetic energy has been stored in the oscillating mass. The common thread in all embodiments is that the energy to be used for torquing the workpiece is developed by oscillating a mass spring system at or near its resonant frequency.

The benefits of a tool based on this concept comprise low tool weight. Current tools need a large enough motor/inertia combination to develop enough kinetic energy to overcome the current workpiece torque level while accelerating the inertia through the limited travel angle. In the present invention by continuing to apply the excitation for a longer time, greater torque amplitude can be achieved without increasing motor or inertia size.

Figure 2:
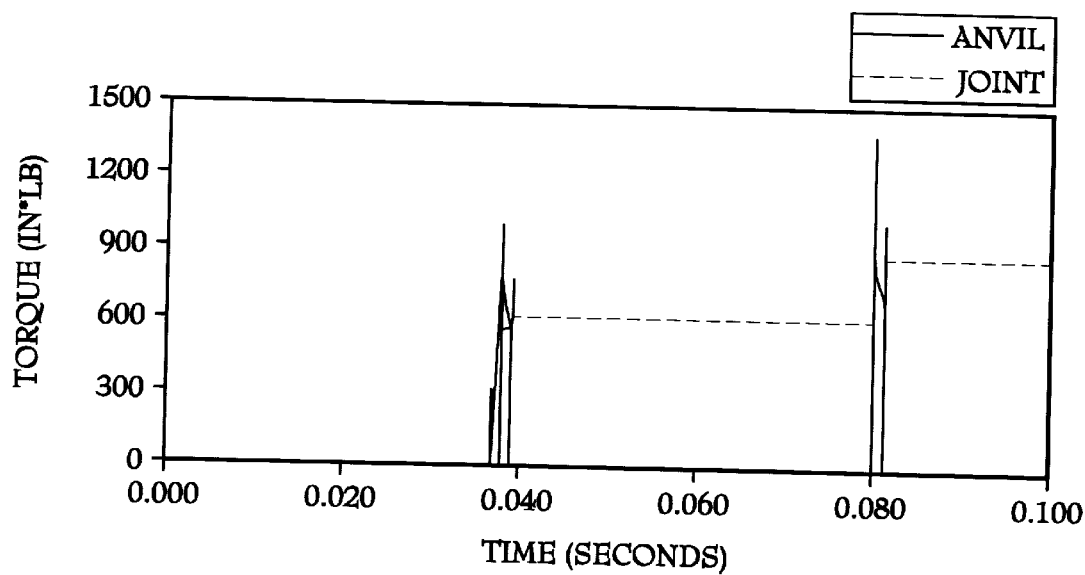
FIG. 2 is a graph showing the application of torque on a fastener over time for an accelerated mass-based impact tool according to the prior art.

The tool at the present invention exhibits low reaction and low vibration. The excitation frequencies may be generally high relative to the torque delivery frequency of the current tools. These higher frequencies are more easily attenuated than the frequencies associated with the repeated "flywheel spinup" of current tools (see FIG. 2). In oscillating mass-based approaches that utilize narrow band excitation frequencies, sound and vibration reduction strategies are easier to implement, as compared to implementation in the face of the broadband behavior of current impact tools. In addition, impact surfaces may be eliminated resulting in less noise and wear.

The tools according to the present invention are easier to control and exhibit greater torquing accuracy. The tool of the present embodiment delivers torque to the workpiece in smaller, more frequent torque pulses. The smaller pulses allow a finer control over the applied torque and is less dependent on workpiece stiffness, i.e., joint rate than current low reaction tools. In addition, the present concept lends itself well to electronically driven embodiments which provide increased user control in other ways, for example operating speed. Having described our invention in terms of a preferred embodiment, we do not wish to be limited in the scope of our invention except as claimed.

What is claimed is:

1. A resonant oscillating mass-based torquing tool comprising:

a rotatable resonant oscillating mass;

a means for effecting oscillation of said mass;

a spring means connecting said oscillating mass to a rotating friction set workpiece;

a means for effecting a rotation bias with said oscillating mass in one tightening rotational direction of a magnitude sufficient only in combination with a force generated by said oscillating mass in said same one tightening rotational direction to rotate said workpiece in a tightening direction; and a force generated by said oscillating mass in an opposite rotational direction minus said rotational bias being insufficient to effect rotation of said workpiece in said opposite rotational direction.

2. An oscillating mass-based torquing tool according to claim 1 wherein:

said torquing tool comprises a handheld torque wrench.

3. A resonant oscillating mass-based torquing tool according to claim 1 wherein:

said spring means comprises a torsion spring.

4. A resonant oscillating mass-based torquing tool according to claim 1 wherein:

said spring means permits relative rotation between said rotatable resonant oscillating mass and said friction set workpiece.

5. A resonant oscillating mass-based torquing tool according to claim 1 wherein:

said means for effecting a rotational bias applies a biased torque in one tightening direction.

6. A resonant oscillating mass-based torquing tool according to claim 5 wherein:

said means for effecting a rotational biases the torque in the rotation direction in the amount of about 10 to 20 percent of a final output torque.

7. A resonant oscillating mass-based torquing tool according to claim 1 wherein:

a position of said oscillating mass is determined by a position encoder.

8. A resonant oscillating mass-based torquing tool according to claim 7 wherein:

said position encoder comprises an optical position encoder.

\* \* \* \* \*